United States Patent
Bytzek et al.

(10) Patent No.: US 10,555,378 B2
(45) Date of Patent: Feb. 4, 2020

(54) VEHICLE HEATER AND METHOD FOR PRODUCING A VEHICLE HEATER

(71) Applicants: Dietmar Bytzek, Germersheim (DE); Thorsten Kabelitz, Munich (DE); Karl Goettl, Rosenheim (DE); Daniel Eckert, Stockdorf (DE)

(72) Inventors: Dietmar Bytzek, Germersheim (DE); Thorsten Kabelitz, Munich (DE); Karl Goettl, Rosenheim (DE); Daniel Eckert, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 802 days.

(21) Appl. No.: 14/379,087

(22) PCT Filed: Feb. 7, 2013

(86) PCT No.: PCT/EP2013/052479
§ 371 (c)(1),
(2) Date: Aug. 15, 2014

(87) PCT Pub. No.: WO2013/120767
PCT Pub. Date: Aug. 22, 2013

(65) Prior Publication Data
US 2015/0014295 A1    Jan. 15, 2015

(30) Foreign Application Priority Data
Feb. 16, 2012  (DE) .................. 10 2012 202 374

(51) Int. Cl.
*H05B 3/26* (2006.01)
*G01K 7/16* (2006.01)

(52) U.S. Cl.
CPC ............. *H05B 3/262* (2013.01); *G01K 7/16* (2013.01); *Y10T 29/49083* (2015.01)

(58) Field of Classification Search
CPC ................ G01K 7/16; H05B 2203/003; H05B 2203/01; H05B 2203/013;
(Continued)

(56) References Cited

U.S. PATENT DOCUMENTS

| | | | |
|---|---|---|---|
| 4,149,066 A * | 4/1979 | Niibe | H05B 3/36 219/212 |
| 5,895,591 A | 4/1999 | Kojima et al. | |
| 7,224,256 B2 * | 5/2007 | Parsons | G01F 1/692 219/270 |

FOREIGN PATENT DOCUMENTS

| | | |
|---|---|---|
| DE | 20 2011 002763 U1 | 9/2011 |
| JP | S5544362 U | 3/1980 |

(Continued)

OTHER PUBLICATIONS

Translation of EP 1361089.*
(Continued)

*Primary Examiner* — Dana Ross
*Assistant Examiner* — Joseph W Iskra
(74) *Attorney, Agent, or Firm* — Quarles & Brady LLP (57) ABSTRACT

A vehicle heater comprises a main body carrying a non-intrinsically safe heat conductor layer, and a sensor device allocated to the heat conductor layer and provided to detect an exceedance of a temperature threshold value. The sensor device comprises a sensor layer arranged on the side of the heat conductor layer facing away from the main body which is monitored for current flows which may occur substantially in the direction of its surface normal. In a method for producing a vehicle heater a main body of the vehicle heater is equipped with a non-intrinsically safe heat conductor, and a sensor device for detecting exceedances of a temperature threshold value. A sensor layer provided to be monitored for current flows which may occur substantially in the direction of the surface normal of the sensor layer is allocated to the (Continued)

heat conductor layer on its side facing away from the main body to form the sensor device.

10 Claims, 3 Drawing Sheets

(58) Field of Classification Search
CPC ........ H05B 2203/017; H05B 2203/023; H05B 3/262; Y10T 29/49083
USPC .......................................................... 219/209
See application file for complete search history.

(56) References Cited

FOREIGN PATENT DOCUMENTS

| | | | |
|---|---|---|---|
| JP | H04106893 | A | 4/1992 |
| JP | H0875690 | A | 3/1996 |
| JP | H09283262 | A | 10/1997 |
| JP | 2004207212 | A | 7/2004 |
| KR | 1020060121638 | A | 6/2008 |
| KR | 100893553 | B1 | 4/2009 |
| WO | 2007029981 | A1 | 3/2007 |
| WO | WO2007029981 | * | 3/2007 |
| WO | 2009154450 | A1 | 12/2009 |

OTHER PUBLICATIONS

English Language Translation of JPS5544362 (Year: 1980).*
International Search Report under dated Apr. 29, 2013 in connection with PCT/EP2013/052479.

\* cited by examiner

VEHICLE HEATER AND METHOD FOR PRODUCING A VEHICLE HEATER

CROSS-REFERENCE TO RELATED APPLICATIONS

This application represents the national stage entry of PCT International Application No. PCT/EP2013/052479 filed Feb. 7, 2013 which claims the benefit of German Patent Application 10 2012 202 374.7 filed Feb. 16, 2012, both of which are hereby incorporated herein by reference for all purposes.

The invention relates to a vehicle heater comprising a main body carrying a non-intrinsically safe heat conductor layer, and a sensor device allocated to the heat conductor layer which is provided to detect an exceedance of a temperature threshold value.

The invention further relates to a method for producing a vehicle heater, particularly a vehicle heater as described here. According to the method it is intended that a main body of the vehicle heater is equipped with a non-intrinsically safe heat conductor layer and a sensor device for detecting exceedances of a temperature threshold value.

The main body may, for example, be a heat exchanger in both cases, particularly a metal/air and/or a metal/liquid heat exchanger.

In contrast to intrinsically safe heat conductor layers, for example PTC heat conductor layers, which can independently prevent an excessive increase of the temperature by limiting the current flow all types of heat conductor layers not having precisely this capability of avoiding unsafe conditions in case of a defect are meant with non-intrinsically safe heat conductor layers here.

The non-intrinsically safe heat conductor layer may, without being limited thereto, for example be provided to be supplied with comparably high voltages (for example 250 volt direct voltage), wherein excessively high voltages may, for example, be clocked down by pulse width modulation if this seems advantageous. Such, as compared to conventional on-board networks of 12 or 24 volts, relatively high voltages are often available anyway, for example in electric or hybrid vehicles. In such environments, for example, electric vehicle heaters having a capacity in the range of three to eight kilowatts can definitely be operated, wherein the field of application of the invention is by no means limited to this output range or these vehicle types.

A vehicle heater comprising a heat conductor layer in the form of a non-intrinsically safe heating element is, for example, known from the patent specification EP 1 361 089 B1. According to this publication, three alternative sensors for the surface-specific detection of a heat radiation representing the heating element are provided for monitoring the temperature, wherein the heating element is formed as a meander-shaped corrugated rib. One of these sensors is designed as a contact-free infrared sensor. Another sensor contacting the heating element is provided in the form of an electric resistance line integrated in the heating element. The third sensor suggested there is also disposed in the area of the heating element or integrated in the same and operates on the basis of a temperature sensitive optic fibre. One disadvantage of the two sensors disposed in the area of the heating element is that both the subsequent integration of the resistance line and the subsequent integration of the optic fibre are labour-intensive and thus cost intensive, leaving aside the fact that these separate components themselves are comparatively expensive. In addition, these two sensors are, due to their conductor character, i.e. an elongated cylinder shape, possibly not capable of detecting isolated or local exceedances of a temperature threshold value if the corresponding overheated spots or locations are not, by chance, located directly under the respective conductor but, for example, in the area of the edges of the meander-shaped corrugated rib.

From other fields of the art it is known to provide sensor layers on main bodies to detect exceedances of a temperature threshold value as an alternative to the use of separate components, wherein the sensor layers are directly formed on the main body or on materials already carried by it using appropriate baking processes. However, a sensor layer is always provided between the main body to be heated and the heat conductor layer here. This is disadvantageous because, in this way, the heat transfer from the heat conductor layer to the main body to be heated is deteriorated. Apart from that, the main body constitutes a heat sink for an adjacent sensor layer which may impede particularly the detection of only very small or isolated overheated areas because the heat released there will, in many cases, be transferred to the main body comparably rapidly. The measurement results are relatively inaccurate in case of such a structure.

It is the object of the invention to describe, based on the generic vehicle heaters and on the generic methods for producing vehicle heaters, a solution for a cost-efficient and yet relatively precisely measuring sensor device capable of reliably detecting even isolated or local exceedances of a temperature threshold value without a negative effect being exerted on the heat conductivity between main body and heat conductor layer.

This object is solved by the features of the independent claims. Advantageous embodiments and further developments of the invention emerge from the dependent claims.

What is suggested is, first, a vehicle heater comprising a main body carrying a non-intrinsically safe heat conductor layer. A sensor device provided for detecting an exceedance of a temperature threshold value is allocated to this non-intrinsically safe heat conductor layer. In this context it is contemplated that the sensor device comprises a sensor layer arranged on the side of the heat conductor layer facing away from the main body which is monitored for current flows which may occur substantially in the direction of its surface normal. In this solution no sensor layer components are provided between the main body and the heat conductor layer. Therefore, an optimum heat conductivity can be ensured between these two components. Furthermore, the main body does not have the effect of a heat sink well connected to the sensor layer in such an arrangement so that the sensor layer is capable of operating in an extremely precise manner, and of, for example, reliably detecting small-scale local overheating (for example smouldering points). Since a sensor layer is, in the broadest sense, always an, at least in sections, planar layer it may be monitored for potential current flows in the direction of its (possibly respective) surface normal. A planar sensor layer in this sense is to be understood to also include, for example, a sensor layer composed of one or more (possibly extremely narrow) strips here, for example, also a layer composed of strips in which the strip is wound around a cylinder surface several times and on different levels so that a multitude of (differential) surface normals emerges. The sensor layer may, in this case, follow the pathway of a heat conductor layer arranged, for example, in a meandering form, wherein, however, it preferably fully covers the heat conductor layer (connection areas may be left exposed, if required), or the sensor layer may cover larger areas of the main body. For example, the sensor layer may be positioned above a meander-shaped heat conductor layer as an, in the top view, rectangular sensor layer. Here, both solutions in which the sensor layer is disposed directly above the heat conductor layer, i.e. in which the sensor layer contacts the heat conductor layer at least in sections, and solutions in which at least one intermediate layer is provided are contemplable. The current flow in the direction of the surface normal to be detected, if required, may either be "normal" current occurring as a result of the current resistance or the current impedance of the sensor layer and the voltage applied in the direction of the surface normal, or a current caused by a disruptive discharge or an electric arc.

For some vehicle heaters it may be contemplated that the sensor layer was formed with the aid of a thermal spraying method. With the use of thermal spraying methods sensor layers can be produced without the main body being exposed to the temperatures common in baking processes. Such spraying on of sensor layers can be implemented at low costs comparable to those of a baking method, however, it limits the requirements on the temperature tolerance of the used main body (or of the materials already carried by the main body) considerably less. As a result of the use of a spraying method, therefore, also materials are contemplable for the main body which would melt or be otherwise negatively affected in their material properties with regard to the intended use at the temperatures common in baking processes. For example, the main body may, as a result of the use of a suitable spraying method, fully or partly consist of aluminium. Of course also a multitude of other materials are contemplable for the main body, these being materials having good heat conducting properties in many cases. Only by way of example, aluminium alloys, glasses and ceramics are to be mentioned in this connection. Examples for contemplable thermal spraying methods are plasma spraying methods, cold gas spraying methods or flame spraying methods. In some cases it may be advantageous to also form other components of the vehicle heater, for example the heat conductor layer, using a thermal spraying method. Cold gas plasma spraying methods and suspension flame spraying methods are presently considered particular suitable thermal spraying methods. In cold gas spraying a gas, for example nitrogen, is accelerated to high speeds, particles transported in the gas impacting on the main body or a substrate carried by it at high speeds (for example a multiple of the speed of sound) and forming a dense, tightly adhering layer due to the high kinetic energy. In suspension flame spraying first a suspension containing the particles to be sprayed on is prepared to then inject this suspension into a flame. In the process the liquid will, at least partly, however, preferably completely, evaporate, and (ideally) only the respective particles impinge on the target surface so that dense layers can be produced. In any case it is common to the contemplable methods for spraying on the sensor layer that the main body does not have to be exposed to the high temperatures common in baking methods in the process. In this connection it may, for example, be contemplated that the main body is only exposed to temperatures of less than 800° C., less than 650° C. and even less than 500° C. It is comprehensible that the number of materials usable for the main body (and/or any other components already carried by it) will increase the lower the temperatures can be kept. In this context it should be clear that the wording "is exposed to temperatures" does not necessarily mean that the entire main body is to or has to thereby assume this temperature. It is rather exclusively relevant that the main body is, not even in sections, exposed to temperatures which might cause damage to it. Depending on the nature of the main body (size, heat conductivity, etc.) it may therefore definitely be possible in some cases that the main body, for example, already carries components (for example electric or other components) which can only withstand much lower temperatures than 500° C., for example only 100° C. or even less, in the areas not directly exposed to the spraying process.

In some vehicle heaters it may be contemplated that the sensor layer has, at least in sections, a resistance or impedance characteristic involving a negative temperature coefficient. The term "negative temperature coefficient" is to be understood in the broadest sense here. The only thing relevant is that the resistance or impedance of the sensor layer decreases so distinctly when a predetermined temperature threshold is exceeded that this can be reliably detected using a measuring technique. To form a sensor layer having a negative temperature coefficient, for example, materials such as silicon dioxide, silicon carbide, aluminium oxide, titanium oxide and other ceramic materials may be used. In case of a glass ceramic it may, for example, be contemplated that it contains one or more alkali metals, for example in a proportion of up to ten weight percent. It may also be contemplated that the glass ceramic is doped with zirconium oxide, zirconium silicate, quartz, titanium oxide and/or zinc oxide. The proportion of the doping may, for example, amount to up to three weight percent in this case.

Furthermore, vehicle heaters are feasible in which the sensor layer comprises, at least in sections, an insulating layer through which a current flow having substantially the direction of its surface normal will only occur in case of disruptive discharges or electric arc formation. In such embodiments which can be implemented at particularly low costs a suitable insulator the disruptive strength of which matches the voltages applied and the respectively relevant temperature threshold values is selected as the sensor material instead of a material having a negative temperature coefficient in the classical sense. Since, for example, electric arcs generally involve permanent changes in the material such solutions are particularly appropriate if the vehicle heater is to be taken out of service for safety reasons after the occurrence of an electric arc until it is replaced or repaired. The use of at least slightly more cost-intensive NTC materials discussed in the above paragraph, in contrast, will, in many cases, render the detection of local overheating which might lead to the occurrence of electric arcs possible at a sufficiently early point in time to prevent an electric arc from occurring at all by taking suitable countermeasures (reduction or interruption of the current flow through the heat conductor layer).

In many cases it is considered advantageous that the sensor layer comprises a lower contact layer and a upper contact layer. A measuring device may then be connected between these contact layers or electrodes in a simple manner to detect possible current flows between the contact layers and to possibly extrapolate exceedances of a temperature threshold value from such current flows. The contact layers may either exclusively be a component of the sensor layer, or they may assume double functions. For example, it is feasible that a heat conductor layer positioned directly under the sensor layer is, at the same time, used as a lower contact layer, or that the upper contact layer, at the same time, assumes the function of a cover layer. This, of course, is not to exclude that a separate upper cover layer may be used. In any case, the use of contact layers is particularly appropriate because, for example, NTC material disposed between the contact layers may then be regarded as a parallel circuit of a plurality of NTC elements connected between the contact layers. Also if a simple insulator is used a possible disruptive discharge or electric arc between the contact layers may be detected by a measuring device connected between the contact layers irrespective of precisely where the disruptive discharge or the electric arc occurred.

Further, a method for producing a vehicle heater is suggested, particularly a vehicle heater as discussed above. According to the method it is contemplated that a main body of the vehicle heater is provided with a non-intrinsically safe heat conductor layer and a sensor device for detecting exceedances of a temperature threshold value. In the process, a sensor layer provided to be monitored for current flows which may occur substantially in the direction of the surface normal of the sensor layer is allocated to the heat conductor layer on its side facing away from the main body to form the sensor device. This solution as well results in that there are no sensor layer components between the main body and the heat conductor layer. In this way an optimum heat conductivity can also be ensured between these two components within the scope of the method in question. In addition, the main body does not act as a heat sink well connected to the sensor layer here either so that the sensor layer can work extremely precisely and reliably detect, for example, small-scale local overheating (for example smouldering points). Apart from this, the advantages and properties discussed above in connection with the vehicle heater emerge in an analogous or similar manner for the method in question here which is why the associated explanations are made reference to in this place to avoid repetitions.

The same applies analogously to the variants of the production method explained below which is why, to avoid repetitions, the variants of the vehicle heater discussed above are again made reference to with regard to the associated properties and advantages.

Within the scope of the methods it may also be contemplated that the sensor layer is formed with the aid of a thermal spraying method.

The sensor layer may, at least in sections, be provided with a resistance or impedance characteristic including a negative temperature coefficient by the production method.

It is further contemplable that the sensor layer is, at least in sections, formed as an insulating layer through which a current flow having substantially the direction of its surface normal will only occur in case of disruptive discharges or electric arc formation.

For the production method it is also preferred that a lower contact layer and an upper contact layer are allocated to the sensor layer.

From the above it becomes apparent that a basic idea of the invention resides in the possibility to produce electric vehicle heaters, particularly electric vehicle heaters using comparably high operating voltages of, for example, several hundred volts direct voltage at low costs by allocating a, in the broadest sense, planar sensor layer to a non-intrinsically safe heat conductor layer carried by a main body on the side facing away from the main body. A sensor layer structured in this way will not affect the heat transfer from the heat conductor layer to the main body to be heated. Yet it renders monitoring such a sensor layer for possible current flows in the direction of its surface normal possible for extrapolating local (and, of course, all the more general) overheating conditions. Particularly cost-effective embodiments of the invention permit at least the detection of the occurrence of electric arcs and the prevention of a potentially dangerous further operation of the vehicle heater. Ideally, however, the sensor device is sufficiently sensitive to detect potentially dangerous overheating conditions early enough to be able to take suitable countermeasures in time.

The invention will now be explained by way of example with the aid of particularly preferred embodiments with reference to the accompanying drawings in which:

In the Figures the same numerals designate identical or similar components which will, at least partly, not be explained more than once for avoiding repetitions.

Figure 1:
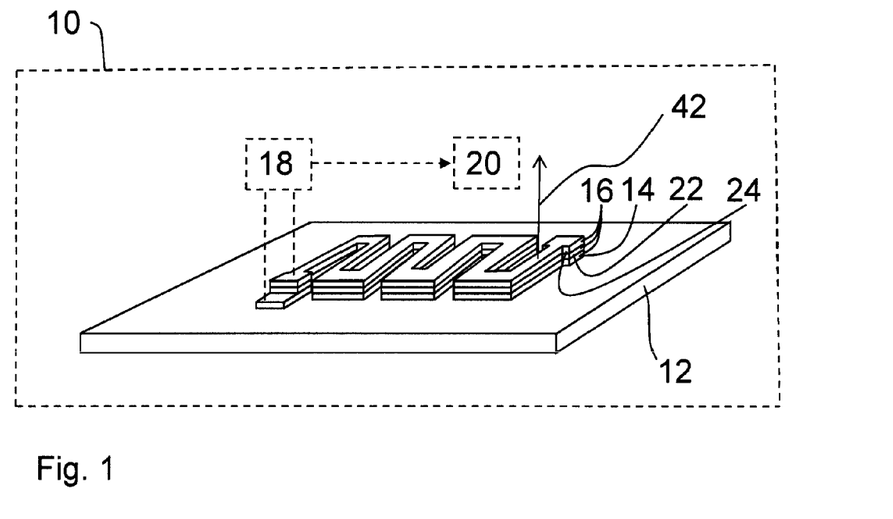
FIG. 1 shows a schematic, partly perspective representation of a first embodiment of a vehicle heater which, at the same time, illustrates process steps for producing this vehicle heater.

FIG. 1 shows a schematic, partly perspective representation of a first embodiment of a vehicle heater 10, and it illustrates, at the same time, process steps for producing this vehicle heater 10.

The vehicle heater 10 shown in FIG. 1 as well as all of the vehicle heaters described below may be both air heaters and so-called water heaters, for example—and without being limited thereto—for electric or hybrid cars. Air heaters differ from so-called water heaters in that in air heaters the air flow to be heated is directly guided over a heat exchanger of the air heating device, while in the so-called water heaters first a liquid, generally a mixture of water—therefore the name—and a frost protection agent, for example glycol, is guided over a heat exchanger of the water heating device to transport the heat to the desired location with the aid the liquid and of another heat exchanger.

The vehicle heater 10, as a whole only schematically shown as a block in FIG. 1, comprises a main body 12 which, in this case, is a heat exchanger. Depending on the type of vehicle heater this heat exchanger 12 is provided for heating air or a liquid for which purpose the heat exchanger 12 may comprise ribs or similar means (not shown) for enlarging the surface effective for the heat exchange at its bottom side.

In the embodiment according to FIG. 1 the heat conductor layer 14 is sprayed directly onto the main body of the vehicle heater 10 formed by a heat exchanger 12. The sensor layer 16 having a negative temperature coefficient is a component of a sensor device which, apart from the sensor layer 16, also comprises a measuring device 18 and a controller 20 which does not have to be exclusively allocated to the sensor device. For example, it is feasible that the controller 20 controls or regulates the operation of the entire vehicle heater, or that the functions essential for the sensor device are performed by a controller 20 which is present in the vehicle anyway. The sensor layer 16 comprises three components in this embodiment, namely the heat conductor layer 14 which, in this case, apart from its actual function as a heating conductor, at the same time forms a component of the sensor layer 16, a layer 22 sprayed onto the heat conductor layer 14 by thermal spraying and having a negative temperature coefficient and an electrically conductive contact layer 24 applied to the layer 22. The mode of operation of this structure is as follows: If, due to any defect, excessive local heating occurs in the area of the heat conductor layer 14, for example a temperature of more than 150° C., this will, in case of a suitable conditioning of the layer 22 having a negative temperature coefficient, result in that its overall resistance or its overall impedance will decrease due to its parallel circuit character dominating in case of a negative temperature coefficient so that this can be reliably detected by the measuring device 18. To this end, the measuring device 18 is connected between the heat conductor layer 14 additionally serving as a lower contact layer and the upper contact layer 24 provided above the layer 22 having a negative temperature coefficient as indicated by the broken lines. In this way, the measuring device 18 can reliably detect the local exceedance of a temperature threshold value based on a clear decrease of the resistance or of the impedance of the layer 22 having the negative temperature coefficient effective between the contact layers, and supply a corresponding signal to the controller 20. Should the respective temperature threshold value be exceeded not only locally but in a larger area this can, of course, all the more be detected in the described manner since then the resistance or the impedance will decrease in a plurality of branches of the imagined parallel circuit of individual NTC elements.

Figure 2:
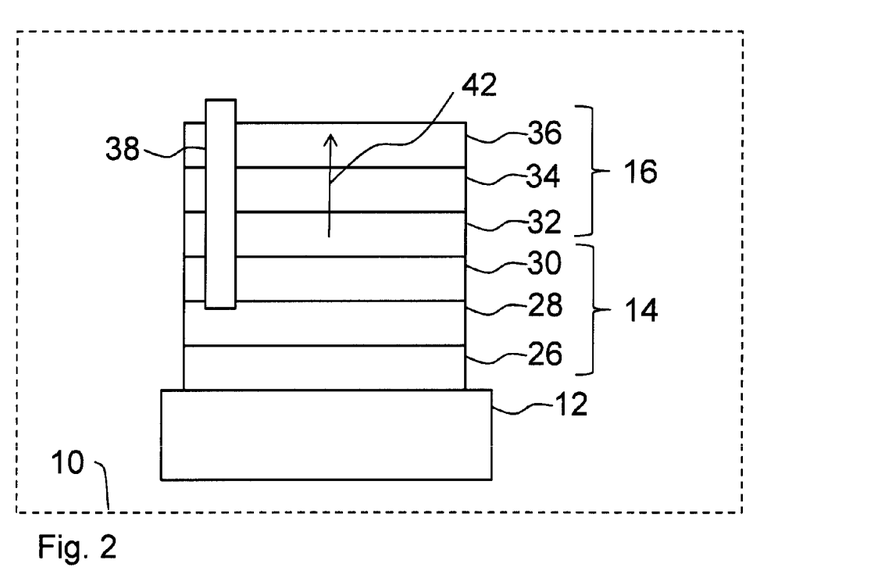
FIG. 2 shows a schematic, partly cut representation of a second embodiment of a vehicle heater which, at the same time, illustrates process steps for producing this vehicle heater.

FIG. 2 shows a schematic, partly cut representation of a second embodiment of a vehicle heater 10, and it illustrates, at the same time, process steps for producing this vehicle heater 10.

In the vehicle heater 10 schematically shown in FIG. 2 the main body 12 is also formed by a heat exchanger. In this case, however, the heat exchanger 12 is made of an electrically conductive material, particularly of aluminium. Therefore, the heat conductor layer 14 is subdivided into in a first insulation layer 26, the actual heating layer 28, and a second insulation layer 30 in this embodiment. Preferably all three components of the heat conductor layer 14 are sprayed on using a thermal spraying method. With regard to the illustration above the heat conductor layer altogether designated by 14 a sensor layer altogether designated by 16 is provided which was also sprayed on using a thermal spraying method and which, in this embodiment, also comprises three components. Directly above the second insulation layer 30 there is a first electrically conductive contact layer 32 onto which a layer 34 of a material having a negative temperature coefficient was sprayed. The layer 34 may—without being limited thereto—particularly consist of one of the materials suggested for layers having a negative temperature coefficient in the general part of the description. Directly onto the layer 34 having a negative temperature coefficient a second electrically conductive contact layer 36 was sprayed. The layer 34 having a negative temperature coefficient is conditioned so that even a local exceedance of a predetermined temperature threshold value in any area of the heat conductor layer 14 will result in that the overall resistance or the overall impedance of the layer 34 having the negative temperature coefficient effective between the first contact layer 32 and the second contact layer 36 clearly decreases due to the parallel circuit character of the structure. This can be reliably detected by a measuring device connected, analogous to FIG. 1, between the contact layers 32 and 36, but not shown in FIG. 2, so that suitable countermeasures can be taken.

In film heating elements as described here the severe defect of electric arc formation may occur in rare cases. For example, if the heat conductor layer 14 is melting on, an electric arc ignition may occur at this generally local fused area, particularly if the heat conductor layer is operated using comparatively high voltages of several hundred volts. The problem of electric arc formation is more severe in heat conductor layers 14 operated with a direct voltage than in heat conductor layers operated with an alternating voltage. The reason is that in an operation involving an alternating voltage the electric arcs usually expire automatically after a short time due to the periodic zero-crossing. This is generally not the case in an operation involving direct voltages—not even in case of pulse width modulated direct voltages. Particularly in direct voltage applications it is, therefore, all the more important to detect electric arcs and to extinguish them by turning the heating current off to be able to exclude fire hazard. In case of an electric arc ignition, an electrically conductive gas channel 38 originating from the heat conductor layer 14 or, in case of multi-layered heat conductor layers, originating from the actual heating layer 28 is formed which punctures or penetrates the other layers on the side of the heat conductor layer 14 facing away from main body. Such a gas channel 38 also leads to a current flow through the layer 34 having a negative temperature coefficient. This leads to a sudden decrease of the overall resistance or overall impedance of the layer 34 having the negative temperature coefficient measured between the first contact layer 32 and the second contact layer 36. This can, analogous to FIG. 1, be reliably detected by the measuring device connected between the contact layers 32 and 36 but not shown in FIG. 2 so that the power supply to the heat conductor layer 14 or to the actual heating layer 28 can be interrupted to extinguish the electric arc. It is particularly advantageous that the measuring device 18 and/or the controller 20 can distinguish changes of the resistance or impedance caused by electric arcs from local or general overheating conditions occurring without electric arcs. Such a distinction may, for example, be made based on threshold values or sets of characteristic curves determined by calculation or experiment. In this way it is, for example, possible to permanently deactivate the vehicle heater in case of electric arc formation until it is repaired. In case of temporary interferences in a water heater, for example missing or stagnant liquid, it is possible to only temporarily deactivate the vehicle heater in this way. It is clear that electric arc formation can, analogously, also be detected in the embodiment shown in FIG. 1 even if no gas channel is illustrated there.

Figure 3:
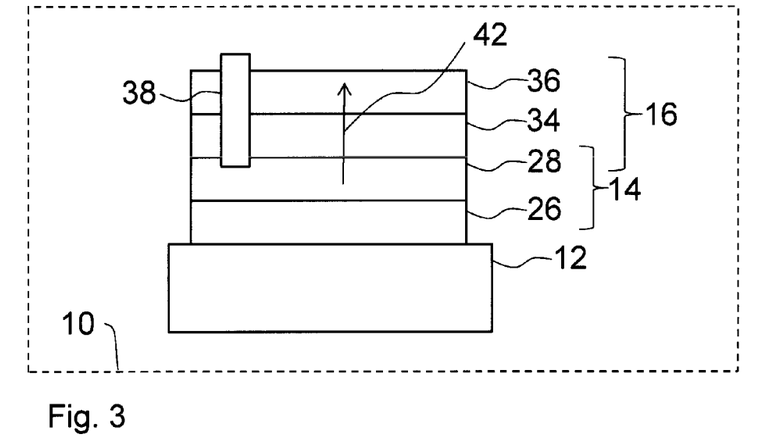
FIG. 3 shows a schematic, partly cut representation of a third embodiment of a vehicle heater which, at the same time, illustrates process steps for producing this vehicle heater.

FIG. 3 shows a schematic, partly cut representation of a third embodiment of a vehicle heater 10, and it illustrates, at the same time, process steps for producing this vehicle heater 10.

The vehicle heater 10 shown in FIG. 3 differs from the vehicle heater according to FIG. 2 in that the second insulation layer 30 and the first contact layer 32 were omitted here. In the embodiment shown in FIG. 3 the heat conductor layer 14 therefore only comprises the lower, first insulation layer 26 and the actual heating layer 28. The actual heating layer 28 assumes a double function here because it, apart from the heating function, also serves as a lower contact layer of the sensor layer altogether designated by 16. The sensor layer 16 therefore includes the actual heating layer 28, the layer 34 having the negative temperature coefficient and the upper contact layer 36 in this case. The measuring device not shown in FIG. 3 either is therefore to be connected between the actual heating layer 28 and the upper contact layer 36 to obtain the functionality described with reference to FIG. 2.

A gas channel 38 caused by an electric arc ignition originates from the actual heating layer 28 in this case and extents through the layer 34 having the negative temperature coefficient so that it can be detected by a measuring device (not shown in FIG. 3) connected between the actual heating layer 28 and the upper contact layer 36 as explained with reference to FIG. 2.

Figure 4:
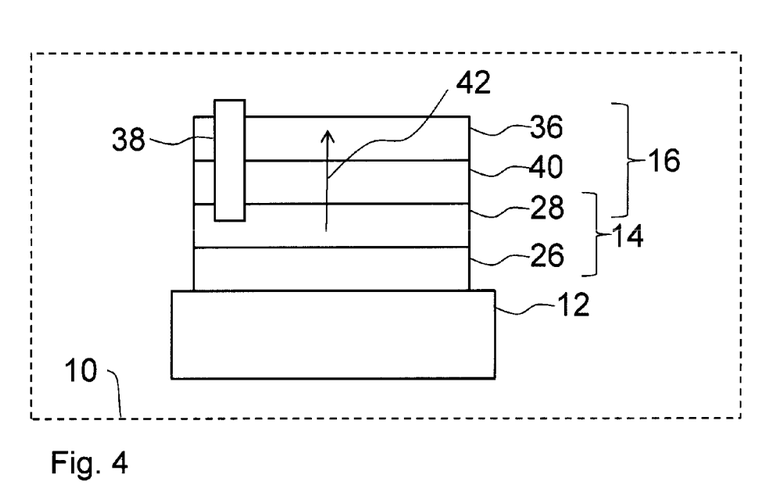
FIG. 4 shows a schematic, partly cut representation of a fourth embodiment of a vehicle heater which, at the same time, illustrates process steps for producing this vehicle heater.

FIG. 4 shows a schematic, partly cut representation of a fourth embodiment of a vehicle heater 10, and it illustrates, at the same time, process steps for producing this vehicle heater 10.

The embodiment shown in FIG. 4 differs from the embodiment according to FIG. 3 in that the sensor layer 16 comprises an insulating layer 40 instead of the layer 34 having a negative temperature coefficient shown in FIG. 3. With a structure simplified in this manner it is still possible to reliably detect a gas channel 38 caused by an electric arc ignition with the aid of a measuring device (not shown in FIG. 4) connected between the actual heating layer 28 and the upper contact layer 36 because in such a case the insulating layer 40 is penetrated by the gas channel 38. Particularly when the main body 12 is an electrically non-conductive main body the insulating layer 26 may be omitted, if required.

Figure 5:
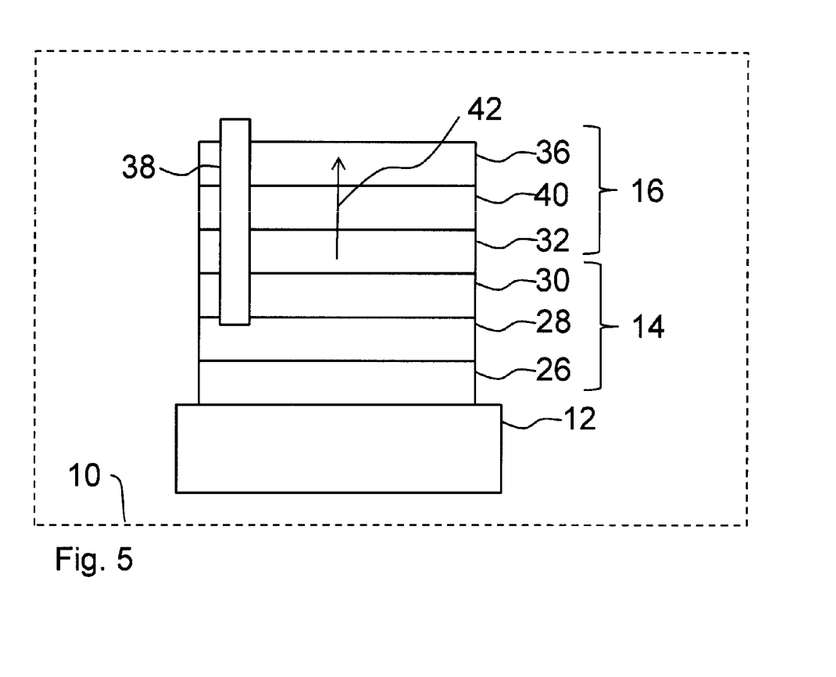
FIG. 5 shows a schematic, partly cut representation of a fifth embodiment of a vehicle heater which, at the same time, illustrates process steps for producing this vehicle heater.

FIG. 5 shows a schematic, partly cut representation of a fifth embodiment of a vehicle heater 10, and it illustrates, at the same time, process steps for producing this vehicle heater 10.

The embodiment shown in FIG. 5 differs from the embodiment according to FIG. 2 in that the sensor layer 16 comprises an insulating layer 40 instead of the layer 34 having a negative temperature coefficient shown in FIG. 2. With a structure simplified in this way it is still possible to reliably detect a gas channel 38 caused by an electric arc ignition with the aid of a measuring device (not shown in FIG. 5) connected between the lower contact layer 32 and the upper contact layer 36 because in such cases the insulating layer 40 is pierced by the gas channel 38. Particularly if the main body 12 is an electrically non-conductive main body the insulating layer 26 can also be omitted in this embodiment, if required.

As mentioned, the respective sensor layers 16 (and preferably also the other layers discussed here) are preferably applied to the main body 12 using a thermal spraying method. Within the scope of the invention, however, also solutions are feasible in which the respective sensor layer 16 is produced as a separate component and then fixed on the heat conductor layer 14, for example by clamps, adhering or thermal bonding using a heat conducting film. If the sensor or the sensor layer 16 is produced as a separate component it is, of course, possible to use common baking methods or high-melting and/or non-sprayable materials to produce the sensor layer 16 even in case of heat sensitive main bodies.

The abovementioned insulating layers 26, 30 and 40 may, for example, be aluminium oxide layers, while the heat conductor layer 14 or the actual heating layer 28 may, for example, be realised by a nickel chromium layer. As contact layers 32, 36, for example, copper layers may be used, and as the layer 34 having the negative temperature coefficient, apart from the materials already mentioned in the general part of the description, for example, also a layer of titanium oxide doped with chromium oxide is contemplable.

The features of the invention disclosed in the above description, in the drawings as well as in the claims may be important for the realisation of the invention both individually and in any combination.

LIST OF NUMERALS 10 vehicle heater
12 main body/heat exchanger
14 heat conductor layer
16 sensor layer
18 measuring device
20 controller
22 layer having a negative temperature coefficient
24 contact layer
26 first insulation layer
28 actual heating layer
30 second insulation layer
32 first contact layer
34 material having a negative temperature coefficient
36 second contact layer
38 gas channel caused by a potential electric arc
40 insulating layer
42 surface normal of the sensor layer

The invention claimed is:

1. A vehicle heater comprising:
a main body having a non-intrinsically safe heat conductor layer;
a sensor device proximal the heat conductor layer and detecting an exceedance of a temperature threshold value, the sensor device including a sensor layer arranged on a side of the heat conductor layer facing away from the main body; and
a measuring device monitoring only current flows through the sensor layer substantially in a direction of a surface normal of the sensor layer.

2. The vehicle heater according to claim 1, in which the sensor layer is a thermal sprayed layer.

3. The vehicle heater according to claim 1, in which the sensor layer has, at least in sections, a resistance or impedance characteristic involving a negative temperature coefficient.

4. The vehicle heater according to claim 1, in which the sensor layer includes, at least in sections, an insulating layer through which a current flow having substantially the direction of its surface normal will only occur in case of disruptive discharges or electric arc formation.

5. The vehicle heater according to claim 1, in which the sensor layer includes a lower contact layer and an upper contact layer.

6. A method for producing a vehicle heater, having a main body of the vehicle heater is provided with a non-intrinsically safe heat conductor layer, and a sensor device for detecting exceedances of a temperature threshold value, said method comprising:
applying a sensor layer forming part of the sensor device onto a side of the heat conductor layer facing away from the main body; and
providing a measuring device monitoring the sensor layer only for current flows substantially in a direction of a surface normal of the sensor layer.

7. The method according to claim 6, in which the sensor layer is formed with the aid of a thermal spraying method.

8. The method according to claim 6, in which the sensor layer is, at least in sections, provided with a resistance or impedance characteristic involving a negative temperature coefficient.

9. The method according to claim 6, in which the sensor layer is, at least in sections, formed as an insulating layer through which a current flow having substantially the direction of its surface normal will only occur in case of disruptive discharges or electric arc formation.

10. The method according to claim 6, in which the sensor layer is disposed between a lower contact layer and an upper contact layer.

\* \* \* \* \*